March 2, 1954 — K. SCHWABE — 2,670,975
ARTICULATION JOINT
Filed Dec. 6, 1949 — 2 Sheets-Sheet 1
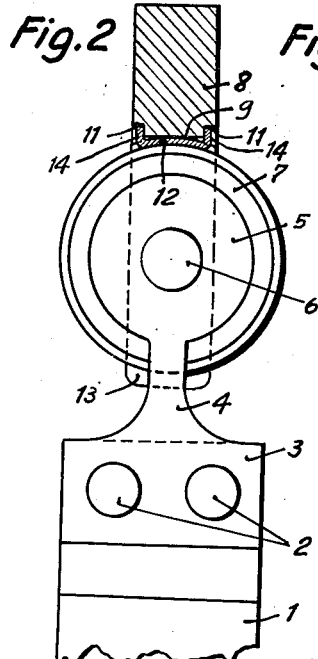
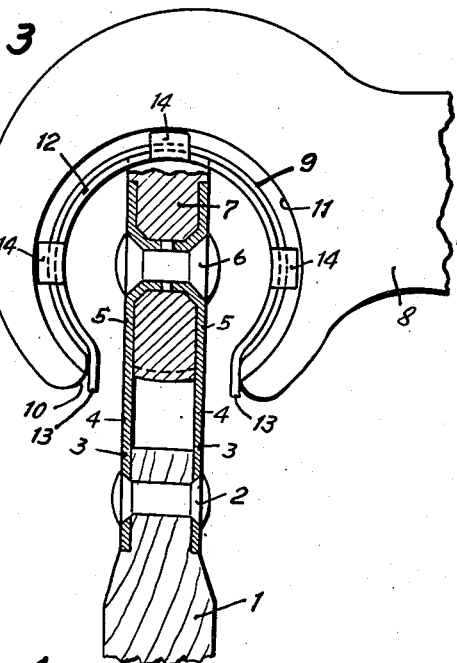
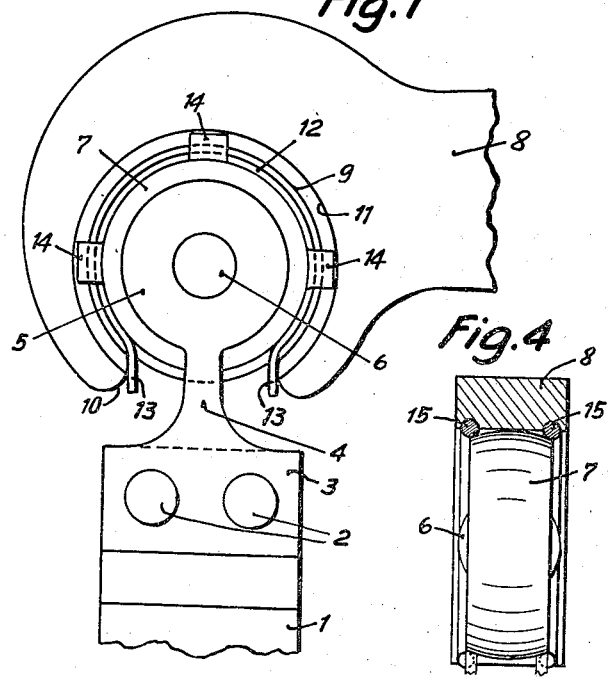
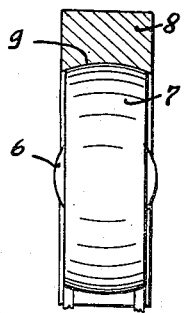
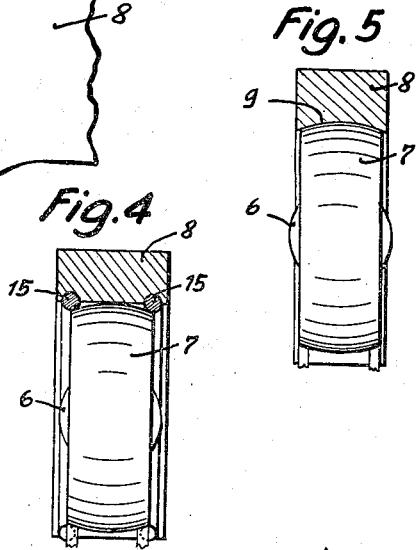
Inventor:
Kurt Schwabe
by Michael S. Striker
his agent

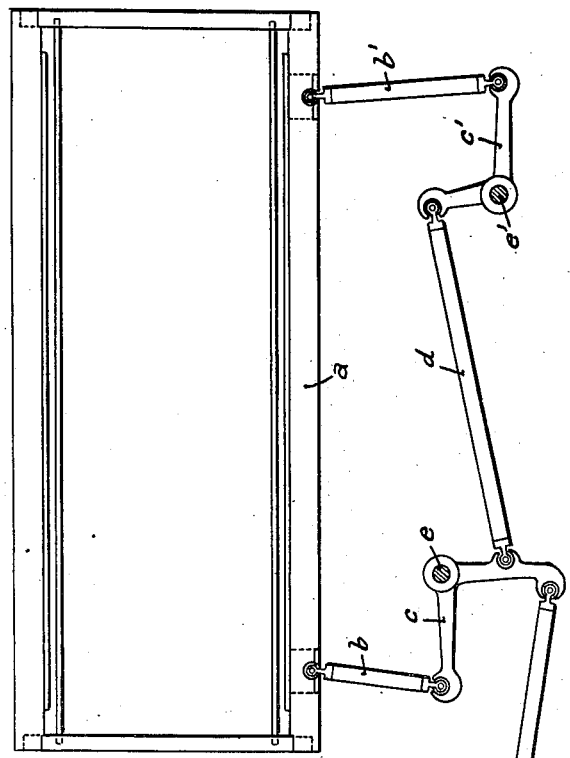
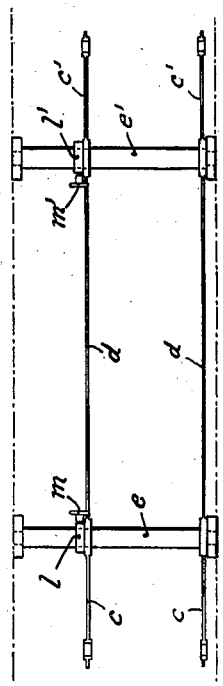
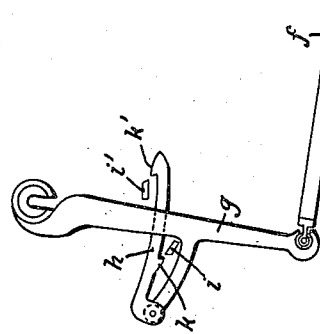
Fig. 6
Fig. 7
Inventor
KURT SCHWABE

Patented Mar. 2, 1954

2,670,975

UNITED STATES PATENT OFFICE 2,670,975

ARTICULATION JOINT

Kurt Schwabe, Le Locle, Switzerland

Application December 6, 1949, Serial No. 131,372

6 Claims. (Cl. 287—87)

The invention relates to an articulation joint for the connection of two components such as the connection of the shafts of a loom to their driving members or of the latter between themselves.

It is a main object of the invention to provide an articulation joint which combines the advantages of a ball joint with the possibility of easier assembling and dismantling than has been possible hitherto with ball joints.

It is another object of the invention to provide an articulation joint wherein the use of screws, wedges, splints or other connecting elements is dispensed with.

It is a further object of the invention to provide a linkage incorporating articulation joints which can be assembled and dismantled without any tools simply by turning one of two associated components of the linkage about its longitudinal axis approximately a quarter turn from its operative position.

Further objects of the invention will appear from the description of some embodiments and applications of the invention later in this specification.

According to a main feature of the invention the articulation joint comprises in combination: a spherical zone member arranged for being attached to the end of one of the said components, a recessed bearing portion arranged on the other one of the said components, laterally open on both sides and having a mouth in its circumference of a width larger than the thickness of the said spherical zone member but smaller than the diameters of the end faces thereof, the said spherical zone member being adapted to be inserted into and withdrawn from the said bearing portion through the said mouth in a position transverse to the said bearing portion, and to be articulated in said bearing portion in a position wherein the axes of the said bearing portion and spherical zone member substantially coincide.

In order that the invention may be better understood and readily carried into effect an embodiment and two modifications thereof as well as an application thereof will be now described by way of example with reference to the accompanying drawing. And while I describe and illustrate useful embodiments and applications of my invention I wish it to be understood that I do not limit myself to the details and dimensions as shown, for obvious modifications will occur to those skilled in the art. In the accompanying drawings:

Fig. 1 shows a lateral elevation of an articulation joint,

Figs. 2 and 3 show the two parts of this articulation joint in such a relative position that they can be assembled and disengaged, one part being shown in section in Fig. 2 and the other part in Fig. 3.

Figs. 4 and 5 show two modified embodiments of this articulation joint in section, Fig. 6 shows a shaft of a loom and the driving members thereof in elevation, and Fig. 7 is a plan view of the shaft mechanism of this loom with the shafts omitted.

At the end 1 of the one of the two components to be connected with one another by the articulation joint, sheet metal fittings 3 are attached parallel to one another by means of rivets 2, each said fitting having a round disc 5 on a stem 4 which projects beyond the end 1 of said component. Between these discs 5 a spherical zone member 7, i. e. a body in the shape of a perforated spherical zone having end faces of equal diameter, is attached by means of a rivet 6. The diameter of the end faces of the spherical zone member 7 is larger than the diameter of the discs 5.

On the other component 8 of the two components to be connected by means of the articulation joint, a bearing aperture 9, open at both sides, is provided which has an open mouth 10 the width of which is smaller than the diameter of the discs 5 but larger than the height of the spherical zone member 7 including the sheet metal thickness of the two discs 5. The part 8 has on each side a circular ledge 11 extending around the bearing aperture 9. In the bearing aperture 9 an open, resilient, insert 12 is inserted which has at its ends projections 13 bearing on the edges of the mouth 10, and which has on each side three radial outward projecting lugs 14 lying on the ledges 11, in such a manner that it is held in its position in the bearing aperture 9. This insert 12 has a spherical inner surface which serves as a bearing and as a race for the spherical zone member 7.

When the component, on the end 1 of which the spherical zone member 7 is held between the discs 5 of the two sheet metal fittings 3, is turned into a position wherein the discs 5 lie transversely to the opening of the mouth 10 of the bearing aperture 9 in the other component 8 (Fig. 2 and 3), the spherical zone member 7 can be shifted in through the mouth 10 into the insert 12 sitting in the bearing aperture 9 of the component 8. When the component 1 with the spherical zone member 7 is subsequently turned about its longitudinal axis through an angle of 90° into the position represented in Fig. 1, the spherical zone surface of the spherical member 7 comes to lie within the spherical inner surface of the insert 12. Since the spherical zone member 7 now lies within the spherical inner surface of the insert 12 it can not emerge laterally therefrom. In this manner a ball-joint like connection between the two components to be connected with one another is effected, which is capable of being disengaged by turning the two components relatively to one another about the longitudinal axis of the component 1 to such an extent that the discs 5 with the spherical zone member 7 stand transversely to the mouth 10 of the bearing aperture of the component 8, and can be withdrawn through the latter.

In the modified embodiment according to Fig. 4 the insert 12 has been replaced by two partly annular guide members 15 of round cross section, which lie in grooves machined into the component 8 and are contacted by the spherical zone member 7. In the modified embodiment according to Fig. 5 even these guide members 15 are dispensed with, and the inner surface of the bearing aperture 9 is made spherical instead.

In Figs. 6 and 7 the principal application of the articulation joint according to the invention is illustrated, viz. the connection of the shafts of a loom with their driving members and of the latter between themselves. Only one connection is shown in Figs. 6 and 7 by way of example. The shaft frames are denoted $a$, which frames are housed shiftably up-and-down in a guide not shown in the drawing and which rest each on two driving rods $b$ and $b'$ the upper ends of which are articulated to the shaft frame $a$. The lower ends of these driving rods $b$ and $b'$ are each articulated to one arm of two bell crank levers $c$, $c'$, respectively, the other arms of which are coupled with one another by means of a connecting rod $d$. The bell crank levers $c$ and $c'$ are rotatably and shiftably arranged on axles $e$, $e'$, respectively, which are journalled in the frame of the loom not shown in the drawing. At the end of that arm of the bell crank lever $c$ to which the connecting rod $d$ is articulated, the end of a connecting rod $f$ is articulated, the other end of which is articulated to the end of a treadle $g$. On the treadle $g$ a lifting wire $h$ is tiltably arranged having the hook ends $k$ and $k'$ which cooperate with the draw knives $i$ and $i'$. All articulations between the shaft frame $a$ and the driving rods $b$ and $b'$, between the latter and the bell crank levers $c$ and $c'$, between the bell crank levers $c$ and $c'$ and the connecting rods $d$, between the bell crank lever $c$ and the connecting rod $f$, and between the latter and the treadle $g$ consist of articulation joints according to the invention. In Fig. 6 the bell crank levers $c$ and $c'$ and the connecting rod $d$ of the foremost and rearmost shafts only are shown. On the axles $e$ and $e'$ adjustment collars $l$ and $l'$ are provided which can be clamped fast by means of clamping screws $m$, $m'$ respectively, whereby the bell crank levers $c$ and $c'$ are held together in the axial direction on their axles $e$ and $e'$. The driving rods $b$ and $b'$, and the connecting rods $d$ and $f$ have flat cross sections and are operatively connected so that they can not be turned about their longitudinal axes when the bell crank levers $c$ and $c'$ are restrained by the adjustment collars $l$ and $l'$ against being axially shifted. Disengagement of the articulation joints is thereby made impossible. For the assembly and dismantling, the clamping screws $m$ and $m'$ of the adjustment collars $l$ and $l'$ as well as the holding members not shown in the drawing are to be loosened, whereupon the shaft frames $a$ and their driving members can be pushed apart in such a manner that a gap is formed of a width sufficient for assembling or separating the components of the articulation joints.

What I claim as my invention and desire to secure by Letters Patent is:

1. An articulated joint, comprising, in combination, a first flat joint member having lateral faces and a relatively narrow peripheral edge face between the same, said first joint member being formed with a circular bearing hole having a circular inner bearing face and with a passage connecting said hole with said edge face; and a second flat joint member including a circular disc-shaped portion provided with a peripheral face having the shape of a spherical zone and with two lateral faces extending transversely to the axis of said disc-shaped portion, and further including a relatively narrow radially extending connecting portion securing said disc-shaped portion to the remainder of said second joint member, said peripheral spherical bearing face of said disc-shaped portion slidably engaging said inner bearing face of said first joint member with said lateral faces arranged in substantially parallel planes and with the axes of said disc-shaped portion and of said circular inner bearing face coinciding for relative turning of said first and second joint members about said axis of said disc-shaped joint portion, the distance between said lateral faces of said second joint member being lesser than the width of said passage so as to permit detaching and mounting of said disc-shaped portion through said passage in a position turned for an angle of 90° about another axis extending normal to said first axis and through said passage.

2. An articulated joint, comprising, in combination, a first flat joint member having lateral faces and a relatively narrow peripheral edge face between the same, said first joint member being formed with a circular bearing hole having a circular inner bearing face forming part of a spherical surface having the center thereof in the center of said bearing hole and with a passage connecting said hole with said edge face; and a second flat joint member including a circular disc-shaped portion provided with a peripheral face having the shape of a spherical zone and with two lateral faces extending transversely to the axis of said disc-shaped portion, and further including a relatively narrow radially extending connecting portion securing said disc-shaped portion to the remainder of said second joint member, said peripheral spherical bearing face of said disc-shaped portion slidably engaging said inner bearing face of said first joint member with said lateral faces arranged in substantially parallel planes and with the axes of said disc-shaped portion and of said circular inner bearing face coinciding for relative turning of said first and second joint members about said axis of said disc-shaped joint portion, the distance between said lateral faces of said second joint member being lesser than the width of said passage so as to permit detaching and mounting of said disc-shaped portion through said passage in a position turned for an angle of 90° about another axis extending normal to said first axis and through said passage.

3. An articulated joint, comprising, in combination, a first flat joint member having lateral faces and a relatively narrow peripheral edge face between the same, said first joint member being formed with a circular bearing hole and with a passage connecting said hole with said edge face; a resilient bearing member having two projecting end portions and a part-annular portion connecting said projecting end portions, said resilient bearing member being located in said bearing hole with said projecting end portions projecting through said passage, said annular portion being formed with an inner bearing face forming part of a sphere having the center thereof in the center of said bearing hole, said resilient bearing member being provided with radially extending lugs secured to said annular portion and engaging said lateral faces of said first joint member; and a second flat joint member including a circular disc-shaped portion provided with a peripheral face having the shape of a spherical zone and with two lateral faces extending transversely to the axis of said disc-shaped portion, and further including a relatively narrow radially extending connecting portion securing said disc-shaped portion to the remainder of said second joint member, said peripheral spherical bearing face of said disc-shaped portion slidably engaging said inner bearing face of said resilient bearing member with said lateral faces arranged in substantially parallel planes and with the centers of said peripheral spherical face of said disc-shaped portion and the center of said spherical inner bearing face of said resilient bearing member coinciding for relative turning of said first and second joint members about said axis of said disc-shaped joint portion, the distance between said lateral faces of said second joint member being lesser than the distance between said projecting end portions of said resilient bearing member so as to permit detaching and mounting of said disc-shaped portion through said passage in a position turned for an angle of 90° about another axis extending normal to said first axis and through said passage.

4. An articulated joint, comprising, in combination, a first flat joint member having lateral faces and a relatively narrow peripheral edge face between the same, said first joint member being formed with a circular bearing hole having a cylindrical inner bearing face and with a passage connecting said hole with said edge face; a second flat joint member including a circular disc-shaped portion provided with a peripheral face having the shape of a spherical zone and with two lateral faces extending transversely to the axis of said disc-shaped portion, and further including a relatively narrow radially extending connecting portion securing said disc-shaped portion to the remainder of said second joint member, said peripheral spherical bearing face of said disc-shaped portion slidably engaging said inner bearing face of said first joint member with said lateral faces arranged in substantially parallel planes and with the axes of said disc-shaped portion and of said circular inner bearing face coinciding for relative turning of said first and second joint members about said axis of said disc-shaped joint portion, the distance between said lateral faces of said second joint member being lesser than the width of said passage so as to permit detaching and mounting of said disc-shaped portion through said passage in a position turned for an angle of 90° about another axis extending normal to said first axis and through said passage; and two annular members secured to said first joint member and located in said bearing hole spaced from each other and slidably engaging said spherical peripheral face of said disc-shaped portion adjacent to said lateral faces of the same.

5. An articulated joint according to claim 1 wherein said radially extending connecting portion includes a pair of sheet metal plates, each sheet metal plate including a circular portion secured to one lateral face of said disc-shaped portion, and a narrow neck portion connecting said circular portion with the remainder of said second joint member.

6. An articulated joint according to claim 3 wherein said radially extending connecting portion includes a pair of sheet metal plates, each sheet metal plate including a circular portion secured to one lateral face of said disc-shaped portion, and a narrow neck portion connecting said circular portion with the remainder of said second joint member.

KURT SCHWABE.

References Cited in the file of this patent

UNITED STATES PATENTS

| Number | Name | Date |
| --- | --- | --- |
| 543,615 | Dibrell | July 30, 1895 |
| 849,384 | Gault | Apr. 9, 1907 |
| 1,496,466 | Jackson | June 3, 1924 |
| 2,309,281 | Steele | Jan. 26, 1943 |

FOREIGN PATENTS

| Number | Country | Date |
| --- | --- | --- |
| 331,733 | Germany | Jan. 14, 1921 |
| 497,956 | Germany | May 17, 1930 |
| 785,433 | France | May 20, 1935 |
| 870,636 | France | Mar. 18, 1942 |